United States Patent
Massoptier-David et al.

(10) Patent No.: US 10,603,856 B2
(45) Date of Patent: Mar. 31, 2020

(54) CURING PRESS FOR A TIRE BLANK, COMPRISING A TIE ROD

(71) Applicant: COMPAGNIE GENERALE DES ETABLISSEMENTS MICHELIN, Clermont-Ferrand (FR)

(72) Inventors: Michaël Massoptier-David, Clermont-Ferrand (FR); Stéphane Chaland, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 16/060,884

(22) PCT Filed: Dec. 8, 2016

(86) PCT No.: PCT/FR2016/053267
§ 371 (c)(1),
(2) Date: Jun. 8, 2018

(87) PCT Pub. No.: WO2017/098158
PCT Pub. Date: Jun. 15, 2017

(65) Prior Publication Data
US 2019/0009486 A1 Jan. 10, 2019

(30) Foreign Application Priority Data
Dec. 10, 2015 (FR) ..................... 15 62154

(51) Int. Cl.
*B29D 30/06* (2006.01)
*B29C 33/26* (2006.01)
(Continued)

(52) U.S. Cl.
CPC .......... *B29D 30/0629* (2013.01); *B29C 33/26* (2013.01); *B29D 30/0605* (2013.01); *B30B 11/007* (2013.01); *B29C 33/48* (2013.01)

(58) Field of Classification Search
CPC .. B29D 30/0606; B29D 30/0629; B29C 33/26
See application file for complete search history.

(56) References Cited

U.S. PATENT DOCUMENTS 3,460,197 A * 8/1969 Cantarutti .......... B29D 30/0629
425/36
3,464,090 A * 9/1969 Cantarutti .......... B29D 30/0605
264/315
(Continued)

FOREIGN PATENT DOCUMENTS

DE 2422406 A1 8/1975
EP 1323515 A2 7/2003
(Continued)

OTHER PUBLICATIONS

International Search Report Regarding PCT/FR2016/053267 dated Mar. 13, 2017.

*Primary Examiner* — James P Mackey
(74) *Attorney, Agent, or Firm* — Dickinson Wright PLLC; Steven Hurles

(57) ABSTRACT

The curing press for a tire blank includes a frame and a plurality of circumferentially distributed segments which are capable of forming a tread for the tire. Each of the segments has at least one opening. For each segment, at least one tie rod is mounted slidably and rotatably in the opening of the segment on the one hand and hinged to the frame on the other hand. The mounting and hinging form the only connections of the tie rod to elements of the press other than the tie rod.

11 Claims, 5 Drawing Sheets

(51) Int. Cl.
*B30B 11/00* (2006.01)
*B29C 33/48* (2006.01)

(56) References Cited

U.S. PATENT DOCUMENTS

| | | | | | |
|---|---|---|---|---|---|
| 3,779,677 | A | * | 12/1973 | Greenwood | B29D 30/0629 425/46 |
| 3,850,555 | A | * | 11/1974 | Pasch | B29D 30/0629 425/46 |
| 3,852,006 | A | * | 12/1974 | Irie | B29D 30/0629 425/47 |
| 3,897,181 | A | * | 7/1975 | Madaschefsky | B29D 30/0629 425/47 |
| 8,454,336 | B2 | * | 6/2013 | Aperce | B29D 30/0629 425/46 |

FOREIGN PATENT DOCUMENTS

| | | |
|---|---|---|
| EP | 2928677 A1 | 10/2015 |
| JP | 2006312251 A | 11/2006 |
| WO | 2011/001095 A1 | 1/2011 |
| WO | 2014/087089 A1 | 6/2014 |

\* cited by examiner

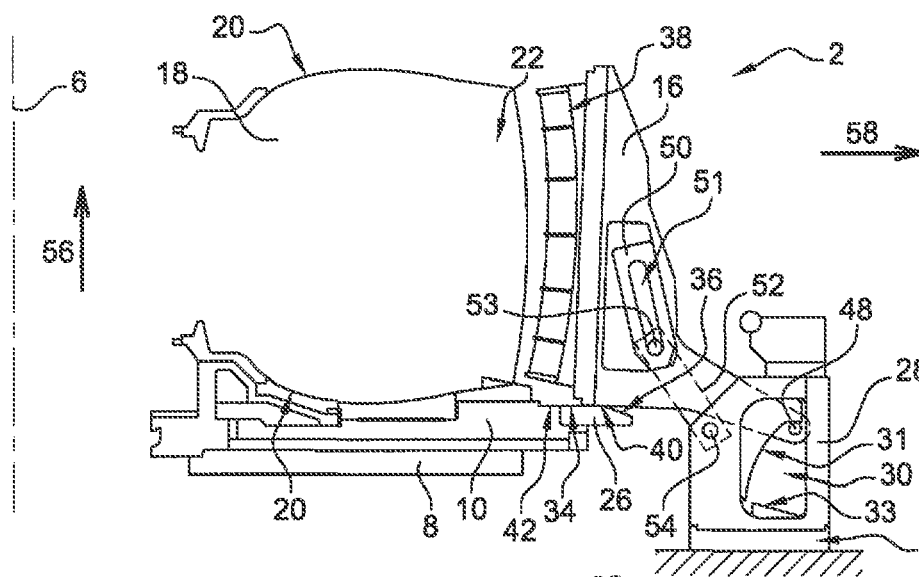
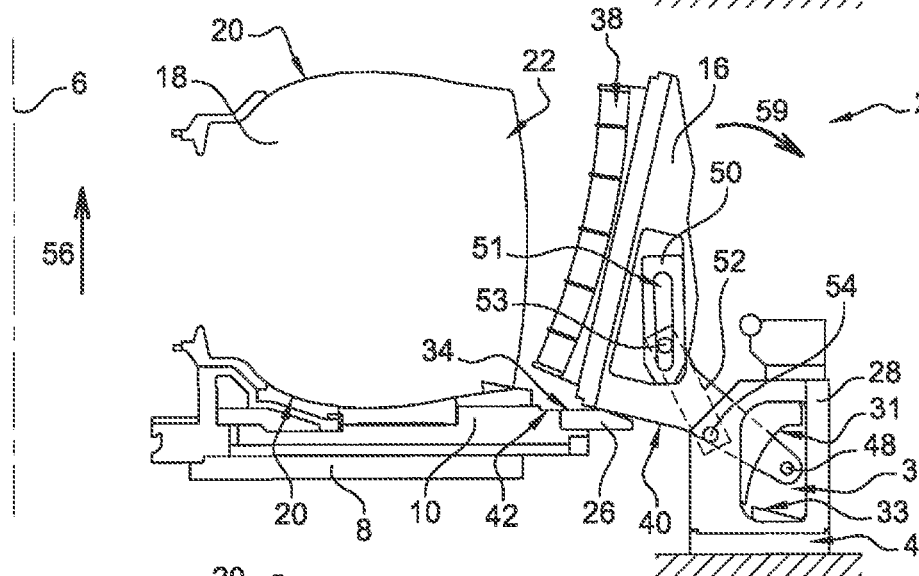
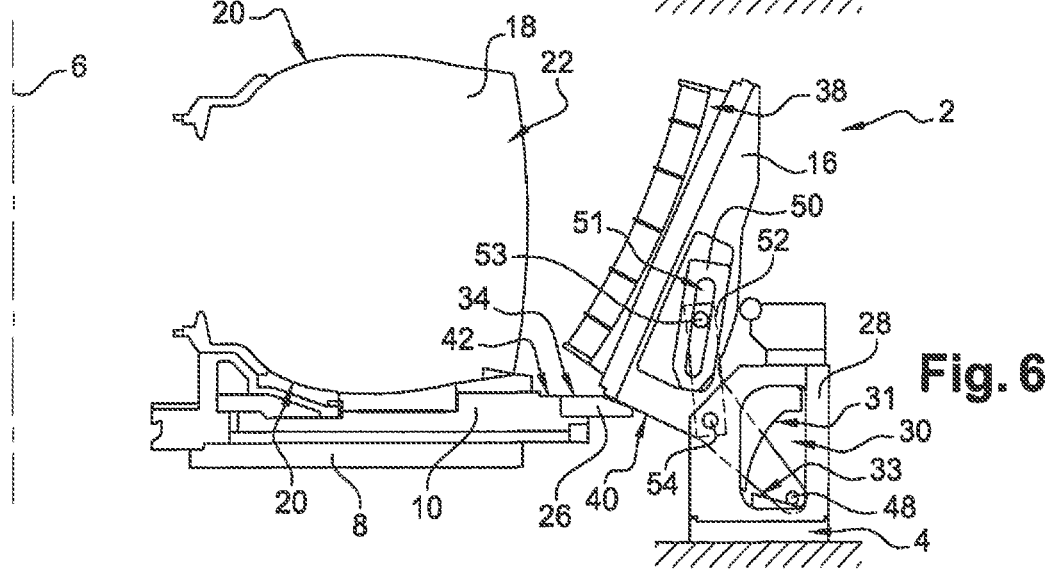

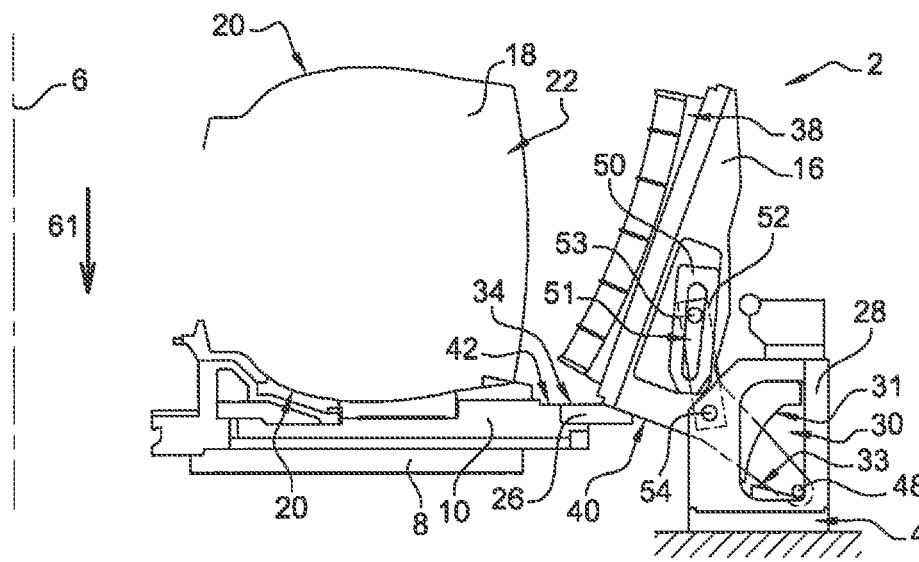
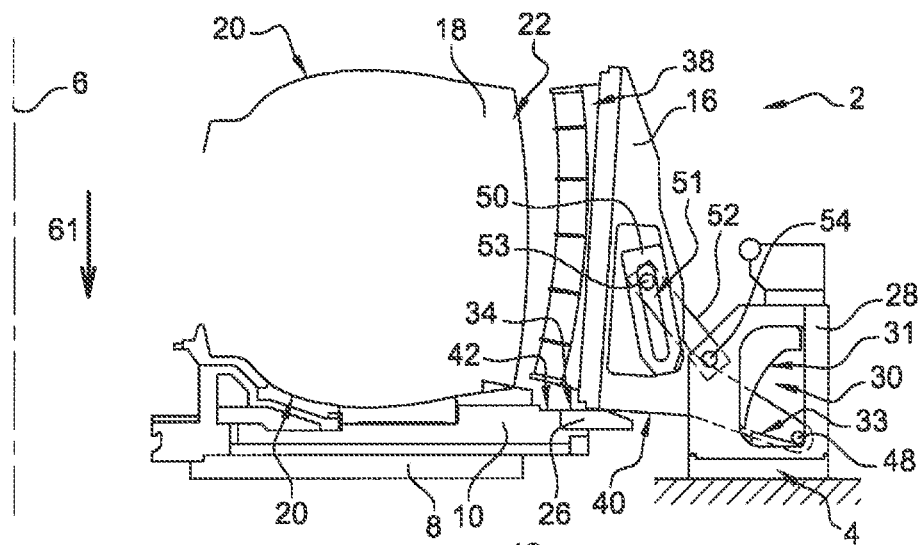
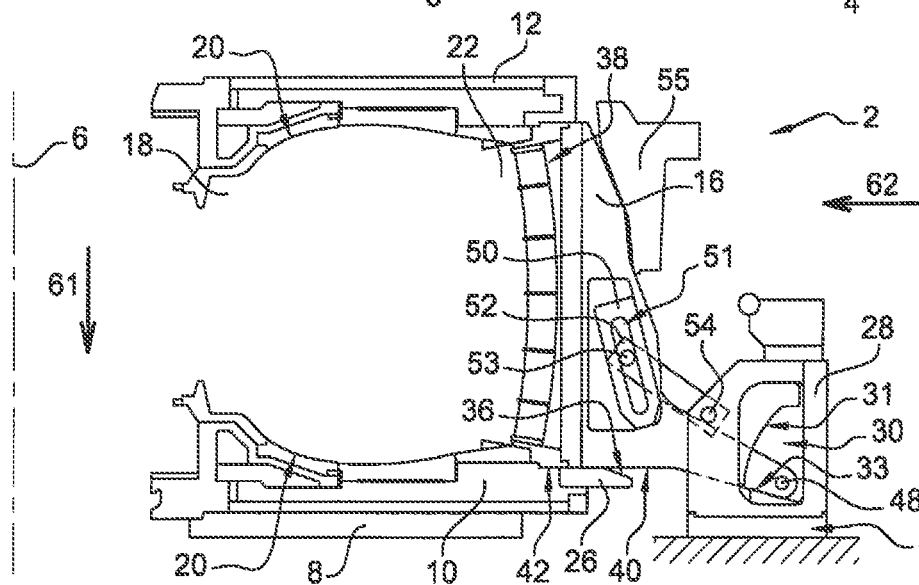

CURING PRESS FOR A TIRE BLANK, COMPRISING A TIE ROD

CROSS-REFERENCE TO RELATED APPLICATIONS

The present application claims priority to PCT International Patent Application Serial No. pct/fr2016/053267, filed Dec. 8, 2016, entitled CURING PRESS FOR A TYRE BLANK, COMPRISING A TIE ROD"," which claims the benefit of FR Patent Application Serial No. 1562154, filed Dec. 10, 2015.

BACKGROUND OF THE INVENTION

1. Field of the Invention

The invention relates to tire manufacture, and particularly to curing molds for tire blanks. In particular, it concerns tires for civil engineering vehicles such as those used in mines.

2. Related Art

The document WO 2011/001095 in the names of the applicants discloses a tire blank curing mold comprising upper and lower shells that are slidable towards one another and serve to mold the sidewalls of the blank, together with lateral segments that are radially movable relative to the axis of the mold and serve to mold the tread. When the mold is opened, the upward sliding movement of the plate carrying the lower shell causes the segments to move radially relative to the shell so as to release the blank. For this purpose, each segment is associated with a lever hinged to the segment, connected to the frame of the mold and bearing on a ramp of the plate forming a face orientated towards the axis. The radial sliding movement of the segments facilitates the removal of the tread patterns from the mold.

The manufacture of tires for civil engineering vehicles gives rise to specific problems. This is because these tyres are extremely large. Moreover, in recent models, they comprise a large number of relatively fine and deep grooves on their treads, which may have a complex shape (corrugated or hooked, for example) which make removal from the mold more difficult. It is therefore necessary to provide a mechanism for making the segments retract over a longer path during a sliding movement or a movement similar to a sliding movement.

SUMMARY OF THE INVENTION

One object of the disclosure is therefore to facilitate the molding, and removal from the mold, of this type of tire.

For this purpose, according to the disclosure, a tire blank curing press is provided, the press comprising:
 a frame,
 a plurality of circumferentially distributed segments capable of forming a tread of the tire, each of these segments having at least one opening, and
 for each segment, at least one tie rod mounted slidably and rotatably in the opening of the segment on the one hand, and hinged to the frame on the other hand, this mounting and hinging forming the only connections of the tie rod to elements of the press other than the tie rod.

Thus, owing to the presence of these tie rods hinged to the segments and the frame, this new type of mechanism offers novel possibilities for causing the segment to retract during removal from the mold. In particular, this retraction may be increased in extent before the segment undergoes swinging or a large degree of swinging. It is thus possible, notably, to provide for the removal from the mold of large tire treads having numerous fine grooves such as the patterns of civil engineering tyres.

Since the tie rod is connected only to the frame and the segment, the device can be simplified and the overall dimensions can be reduced. These connections of the tie rod to the frame and segment are the only two connections, regardless of the operating positions of the press. In other words, throughout a full cycle of opening and closing the mold, no other connection involving the tie rod is used.

It would be possible, notably, to provide a tie rod of generally parallelepipedal shape whose two connecting points would be located at each of its longitudinal ends.

Provision may be made for the tie rod to be hinged to a particular structure of the frame, for example a block.

Provision may be made for the press to be arranged so that each tie rod remains housed at one end of the opening of the corresponding segment during a greater part of the sliding movement of the segment.

This arrangement makes it possible, notably, to prevent the segment from swinging over a greater part of its sliding movement, thereby increasing the extent of this sliding movement.

Provision may be made for the press to be arranged so that each tie rod slides in the opening of the corresponding segment during a sliding movement of the segment.

It is the travel of the tie rod in the opening that enables the segment to swing. The swinging may be the result of an upward sliding movement of an element of the press on which the segment bears.

Advantageously, each segment has two openings facing one another, the corresponding tie rod, or each tie rod, preferably being mounted in these two openings.

Thus the tie rod may, for example, have one end rotatably and slidably mounted in these two openings simultaneously. This enables the stability of this tie rod to be improved, notably during a sliding movement in these openings.

Provision may be made for the press to comprise at least one plate carrying a shell capable of forming a tire blank, the frame comprising ramps arranged to make the segments slide relative to the plate by the action of an upward sliding movement of the plate relative to the frame.

For example, the segment may be capable of bearing against the plate and against the ramp of the frame, and to travel along this ramp as a result of an upward sliding movement of the plate. When the segment travels over the ramp of the frame as a result of the rising of the plate, the segment is initially pressed into place by the tension exerted by the tie rod, one end of which is housed in one end of the opening of the segment, thus preventing the segment from swinging and causing it to slide. Then, when the segment has travelled over a greater part of the ramp of the frame, the tie rod and the opening are positioned in such a way that the tie rod can travel along this opening, thus causing the swinging of the segment, which has then ceased to bear on the ramp.

Preferably, the number of ramps is equal to the number of segments.

Thus the sliding movement of the segment bearing on the ramp of the frame may be controlled, notably by the shape and/or the inclination imparted to this ramp. For example, a gentle slope increases the extent of the sliding movement of the segment before the latter swings.

Preferably, each ramp of the frame is inclined upwards when travelled over in the opposite direction from the press.

Thus, when the corresponding segment travels over this ramp, it is able to move away from the mold.

Also preferably, each ramp of the frame is curved and/or concave.

This is because it is the shape of the ramp that determines the speed of the segment and the variation of this speed during retraction. A concave shape provides a relatively low retraction speed at the start of the movement of the segment, to facilitate the separation of the segment from the tread pattern. It then increases the speed of the segment when the latter is separated from the tread. This increase may be constant, given the concave curved shape. The shape of the ramp also allows a variation of the applied force. Thus the force increases as the vertical is approached. In this way, a greater force may be provided at the start of removal from the mold, for example.

If the ramps of the frame are upper ramps, provision may be made for the frame to further comprise lower ramps against which the segments can bear.

In fact, it would be feasible for the segment to travel over one ramp, for example the upper ramp, while the plate rises, and to travel over the other, lower ramp while the plate descends, or vice versa. The segment can bear on neither ramp, or on at least one of these two ramps, or on both ramps at once, according to the different stages of its movement.

Preferably, each lower ramp is rectilinear and inclined over a greater part of its length.

Provision may also be made for each segment to be trapped in an opening of the frame delimited, at least partially, by one or more of these ramps.

Thus, in case of uncontrolled movements of the segment in unforeseen circumstances, the segment cannot escape or be ejected into the environment of the press.

When the segment has swung and is bearing on the lower ramp of the frame, a return is made to the initial position by the descent of the top ring of the press which can travel over one edge of the segments to make them slide towards the tyre blank.

BRIEF DESCRIPTION OF THE DRAWINGS

An embodiment of the press according to the invention will now be described with reference to the attached drawings, in which:

FIGS. 1 to 10 are partial views in vertical axial section of a press according to the invention in successive steps of a blank curing cycle, only one of the segments being shown in these figures;

DETAILED DESCRIPTION OF THE ENABLING EMBODIMENT

Figure 1:
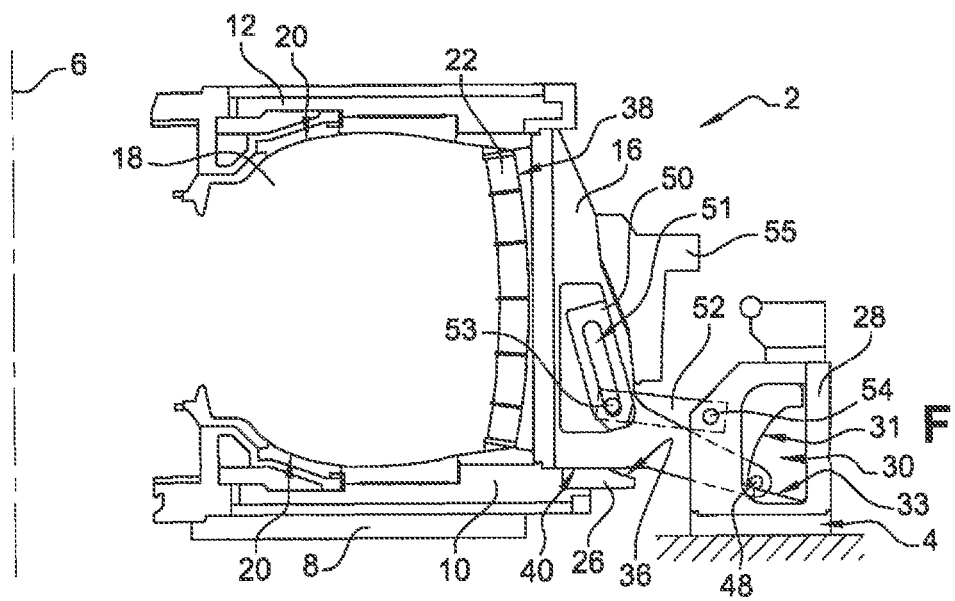

A press according to an embodiment of the invention will now be described with reference to the figures. This press is used for curing and shaping wheel tyre blanks. It may be a press for a wheel for a vehicle such as a utility vehicle, a passenger vehicle or a heavy goods vehicle. In the present case, it is a press for tyre blanks for civil engineering vehicles such as those used in mines.

The press 2 comprises a frame 4 forming a base of a mold which, in the following description, is assumed to be stationary and fixed to the ground. Its general shape has a symmetry of revolution about the vertical axis 6.

The press 2 comprises a lower plate 8 carrying a shell 10 rigidly fixed to the plate 8, on top of the latter. The plate 8 is mounted so as to be vertically slidable along the axis 6 relative to the frame 4. For this purpose, the press comprises guide and drive means which are conventional and are not detailed here.

Similarly, the press comprises a horizontal upper plate (not shown) to which an upper shell 12 is rigidly fixed, under the plate, the plate being mounted to be vertically slidable along the axis 6 relative to the frame 4, here again by the use of guide and drive means which are not detailed. To enable the mold to be opened, the upper plate slides independently of the lower plate 10.

The press also comprises lateral segments 16 which extend at the periphery of the press. Although only one segment is shown in the figures, the press comprises a plurality of segments, between ten and twenty in number, for example. These segments are uniformly distributed about the vertical axis 6. They are identical to one another. The mechanism which will be described, and which is associated with each segment, is identical for all the segments.

The shells 10, 12 and the segments 16 all combine to form a curing mold for the blank. The shells serve mainly to form the respective sidewalls 20 of the tire 18, while the segments 16 form its tread 22, comprising, notably, tread patterns (not shown) including fine grooves. During molding and curing, the shells and the segments form a sealed enclosure that can be pressurized and heated to cure the rubber of the blank in order to produce the tire. The heating and pressurization means are conventional and will not be described here.

For each segment, the lower shell 10 has a flange 26 forming a radial extension of the shell in the opposite direction from the axis 6. The lower plate 8, the lower shell 10 and the flanges 26 all combine to form a rigid solid.

Similarly, for each segment, the frame 4 comprises a block 28 rigidly fixed to a base of the frame and extending projectingly from an upper face of the frame, near its peripheral edge. The frame and its blocks 28 also combine to form a rigid solid.

Figure 11:
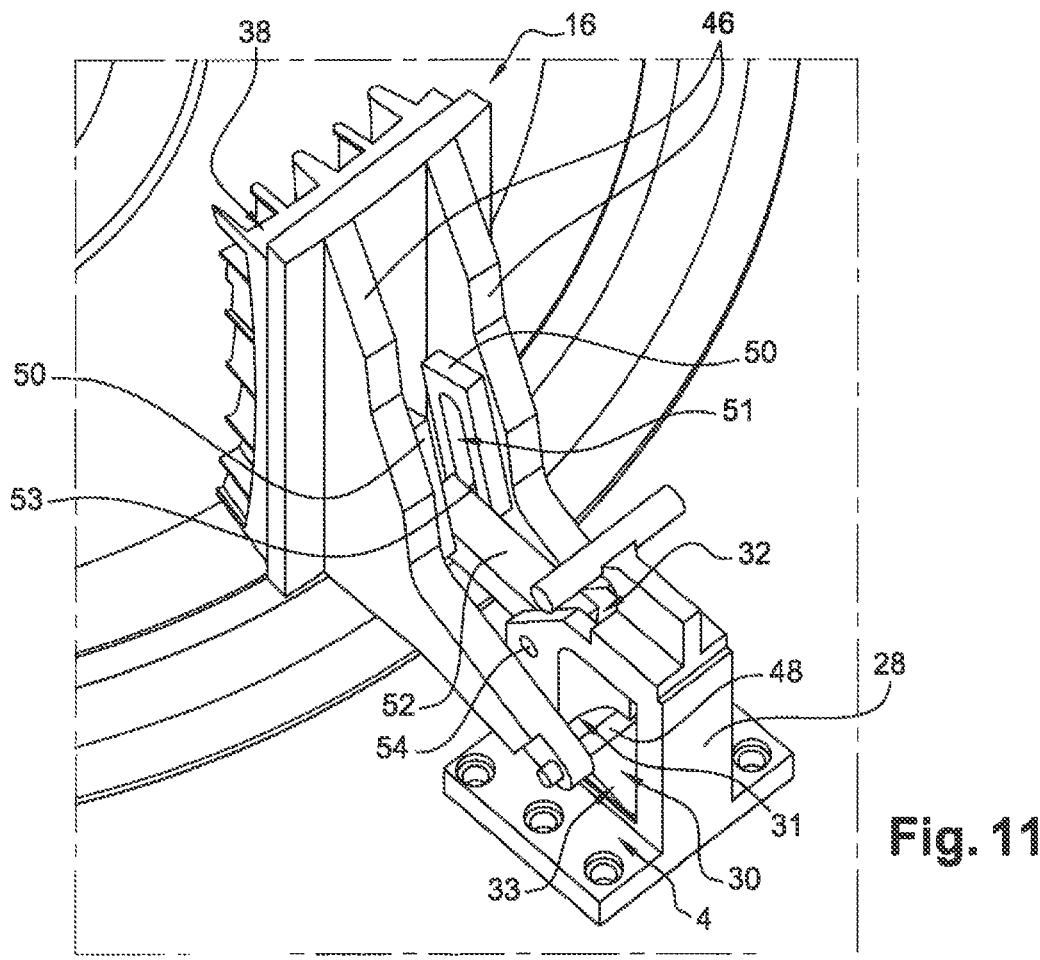
FIGS. 11, 12 and 13 are perspective views of a segment of the press of FIGS. 1 to 10.
Figure 12:
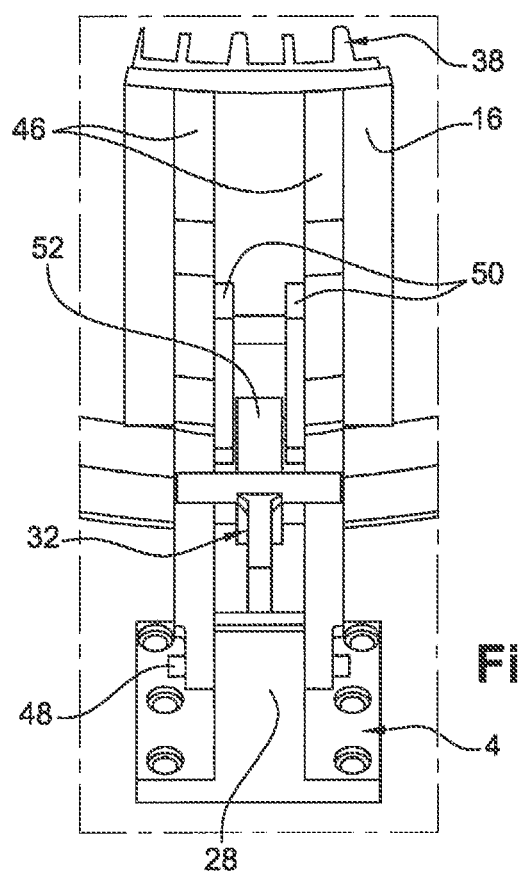
Figure 13:
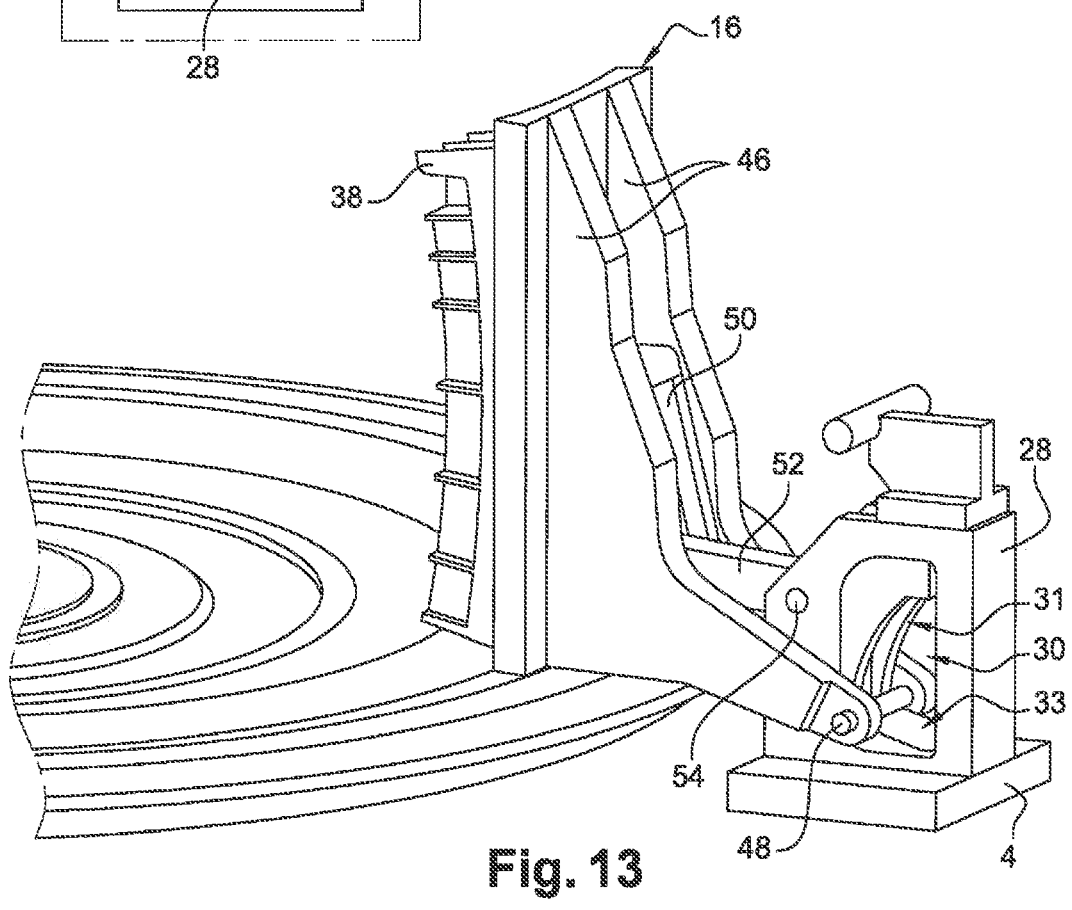

As may be seen in particular in FIGS. 11, 12 and 13, the block 28 has a generally flat shape and is orientated in such a way that its thickness is measured in a plane perpendicular to a plane radial to the axis 6. It has a wide through opening 30 having a closed contour. The block 28 has an upper ramp 31 and a lower ramp 33 at its opening 30. The upper ramp 31 forms the front and upper edges of the opening. It has two portions, namely a concave curved inclined portion and a horizontal straight portion. The inclined portion extends the horizontal portion downwards towards the inside of the press. The lower ramp 33 forms the lower edge of the opening. It is rectilinear over a greater part of its length and is inclined downwards towards the outside of the press. Its end near the rear edge of the opening in the block is gently curved. The front edge of the opening is vertical.

The block 28 also has a radial slot 32 extending along its mid-plane in a part of the block from a side of the block facing the axis 6 and into the opening 30, thus duplicating the latter.

The flange 26 has a horizontal rectilinear upper edge 34 on which the segment 16 is able to bear. It also has a rectilinear peripheral edge 36 which is inclined away from the axis 6 and downwards, and which extends the upper edge 34 at the opposite side from the axis 6, the segment 16 also being able to bear on this edge.

Each segment 16 has a molding part 38 extending vertically and orientated towards the axis 6. The segment also has a flat lower face 40 capable of resting on an upper face 42 of the lower shell 10 and on the horizontal rectilinear upper edge 34 of the flange 26.

In the rear part, on the opposite side from the axis 6, the segment comprises two vertical plates 46 fixed to the part forming the mold by their edge facing the axis, these plates being parallel to one another and spaced apart from one other with respect to a plane radial to the axis 6. The two plates 46 partially cover the respective main faces of the block 28 and are interconnected through the opening 30 by means of a follower 48. This follower has a generally cylindrical circular shape and is hinged to the plates in which it is housed. The segment is trapped in the opening 30. The follower 48 is capable of coming into direct contact with each of the edges of the opening 30 of the block 28, notably the ramps 31 and 33.

The two plates 46 each have a reinforcer 50 with an opening 51 on their inner faces, that is to say on their faces directed towards one another. These two reinforcers have symmetry about a plane radial to the axis 6, and their main dimension is slightly inclined relative to the same axis. They are generally parallelepipedal in shape. The openings 51 have a generally rectilinear elongated shape whose main dimension is also slightly inclined relative to the axis 6.

A tie rod 52 is connected to the segment 16 and the block 28, and has a generally elongated rectilinear and parallelepipedal shape. The tie rod forms a rigid solid. One of the ends of the tie rod is mounted slidably and rotatably in the openings 51 of the segment. More precisely, the tie rod comprises a follower 53, formed by a circular cylinder, which is capable of travelling along the openings 51 of the two plates simultaneously. This follower 53 is mounted in a freely rotatable way relative to the body of the tie rod. It is therefore this follower that allows the slidable and rotatable mounting of the tie rod and the segment. The other end 54 of the tie rod 52 is hinged to the block 28; that is to say it is free to rotate only.

The use of the press during one curing cycle will now be described, with the aid of FIGS. 1 to 10.

In FIG. 1, the press and the mold are closed, the lower shell 10 and the upper shell 12 occupying their lowest positions and the segments 16 occupying their positions nearest to the axis 6. This is the position which is used for curing a tire blank 18. The segment bears, notably, with its lower face 40 against the upper face 34 of the flange 26 and the upper face 42 of the shell 10 on the one hand, and bears with its follower 48 against the lower ramp 33 of the block 28 on the other hand. The follower 53 of the tie rod 52 is housed in the openings 51 of the segment at the ends of the openings nearest to the lower shell 10. The tie rod 52 is in a substantially horizontal position, slightly inclined upwards towards the axis 6. A peripheral top ring 55 acts by a wedge effect, by bearing on the circumferential edges of the plates 46 of the segments, to radially clamp the plates towards the axis 6.

Figure 2:
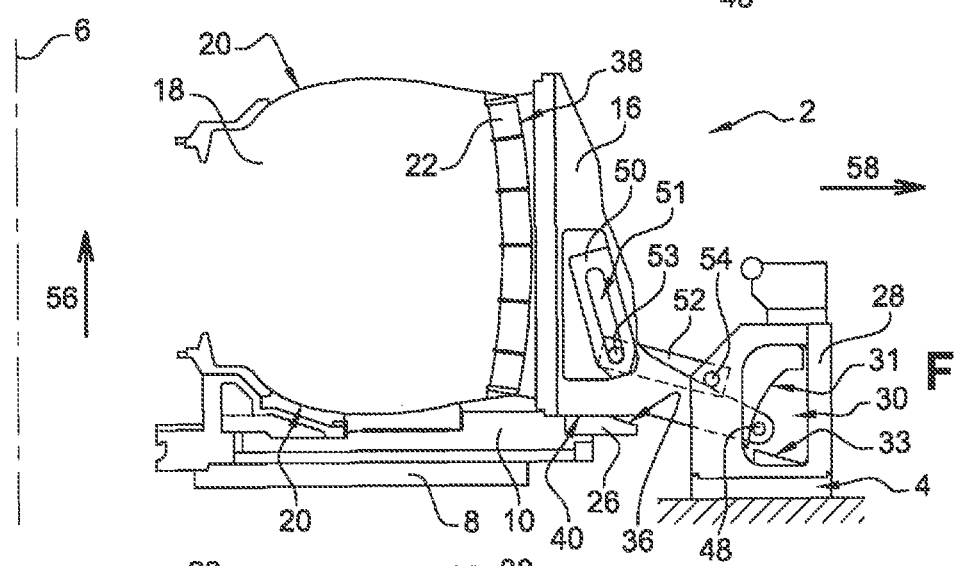

Before the step shown in FIG. 2, the press has been opened by the upward sliding of the upper shell 12 and the top ring 55.

In the step shown in FIG. 2, the lower plate 8, the lower shell 10 and the flange 26 are made to slide upwards relative to the frame, in the direction of the arrow 56. This sliding movement is also that of the segment 16, without any swinging of the segment. The segment then slides in the direction of the arrow 58. When the segment starts to slide, it departs from the ramp 33 on which it was bearing with its follower 48, and comes to bear on the ramp 31. The follower 53 of the tie rod remains housed in the ends of the openings nearest to the lower shell. Consequently, the radial sliding movement of the segments begins, the segments moving away from the tire 18 for the removal of the tread pattern from the mold.

Figure 3:
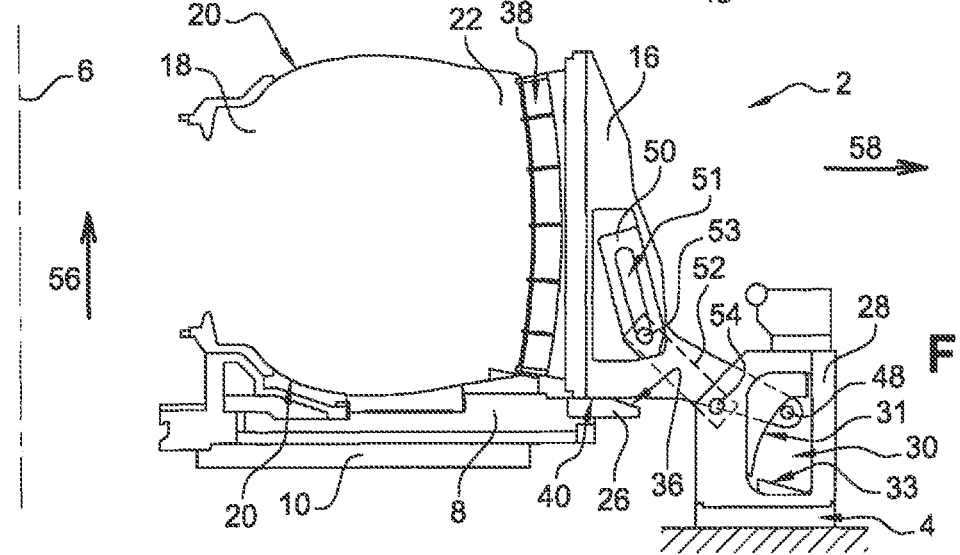

With reference to FIGS. 3 and 4, the same movements continue so that the lower shell 10 is increasingly raised, and the segments 16 become increasingly distant from the axis 6 in the radial direction. During this movement, the follower 48 continues to travel along the ramp 31 in the direction 58, and the follower 53 of the tie rod 52 remains housed in the ends of the openings 51 nearest to the lower shell 10. The inclination of the tie rod increases with the travel along the ramp 31. In FIG. 4, the follower 48 of the segment reaches an upper end of the ramp 31. The segment 16 is then disengaged from the tread pattern 22, but not yet sufficiently to allow the withdrawal of the cured tire. The tie rod is in a substantially vertical position. In FIG. 4, the segment has finished sliding radially, and is starting to swing outwards by rotation as a result of bearing on the ledge, due to the traction exerted by the tie rod.

With reference to FIG. 5, the shell 10 continues to slide in the direction 56, and the segment 16, which has finished travelling along the ramp 31, continues to swing, due to gravity and the traction of the tie rod, in the direction 59. This swinging is permitted both by the inclined portion 36 of the flange 26, against which the lower face 40 of the segment is then bearing, and by the fact that the follower 53 of the tie rod 52 travels along the opening 51 in the direction of the arrow 56.

With reference to FIG. 6, the segment has finished swinging, and is bearing against the lower ramp 33 of the block with its follower 48, as well as against the inclined face 36 of the flange 26 with its lower face 40. The tie rod 52 is then in a substantially vertical position, and its follower 53 is in a mid-portion in the openings 51. This swinging having completely disengaged the cured tire 18, the tire is extracted from the press and a new raw tire blank to be cured is introduced into the press.

With reference to FIGS. 7 and 8, the operations of closing the press are then started. For this purpose, the plate 8, the lower shell 10 and the flange 26 are made to slide downwards relative to the frame 4, in the direction of the arrow 61. The segment 16 follows this descent while swinging due to gravity, since it is bearing against the flange 26, without sliding. This is made possible by the travel of the follower 53 of the tie rod 52 in the openings 51 of the segments towards the ends of these upper openings which are farthest from the lower shell. In FIG. 8, the vertical downward sliding movement of the lower shell has ceased. The segment is bearing on the ramp 33 with its follower 48, and on the horizontal face 34 of the flange 26 with its lower face 40. The segment is not yet in contact with the tread of the raw tire blank. The lower shell is then in its lowest position.

Figure 10:
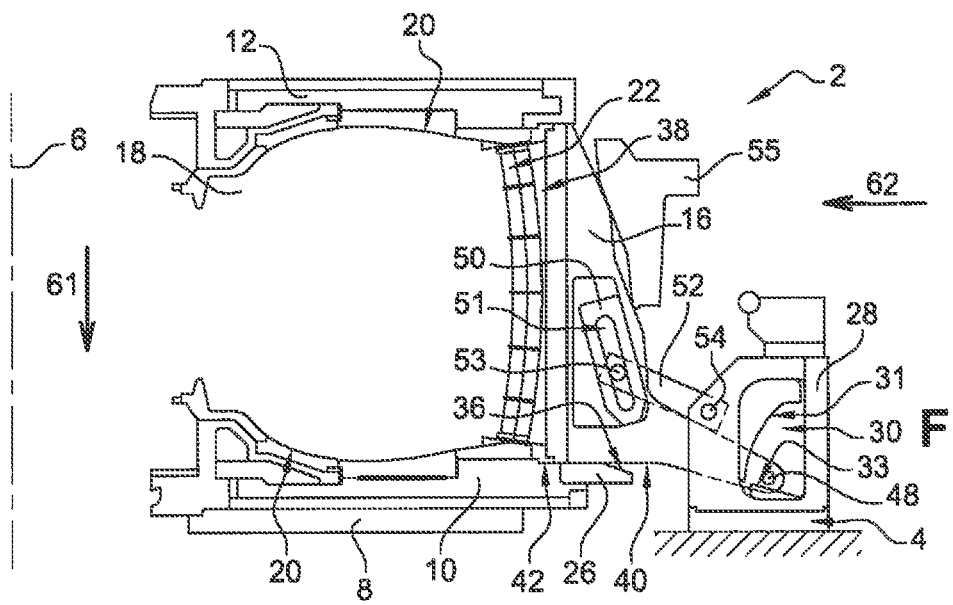

With reference to FIGS. 9 and 10, the upper shell 12 and the top ring 55 are then made to descend. The top ring comes to bear against the outer face of the plates of the segments so that it causes the segments to slide towards the axis 6 and against the blank, in the direction of the arrow 62. During the greater part of this movement, the follower 48 does not bear against the ramp 33. In the course of this movement, the follower 53 of the tie rod 52 travels in the openings 51 of the segments in the direction of the arrow 61. At the end of this movement, the press is again closed and has returned to the configuration of FIG. 1.

All the movements of the segments take place in this way and simultaneously. It may be seen that the ramp 31 and the tie rod 52 are arranged so that the segment can move radially for a long way before the swinging of this segment by gravity is permitted as a result of the upward sliding of the lower shell.

This mold is particularly suitable for the removal of civil engineering tires, particularly those comprising numerous fine grooves, from the mold. This is because it provides a long radial travel of the segment during removal from the mold, with swinging delayed as far as possible. This arrangement reduces the mold removal forces caused by the obstruction of the rubber on the mold. It limits the operating forces and the problems of wear.

In this embodiment, the blocks 28 are screwed to the frame and may therefore be replaced with blocks in which the upper ramp 31 has another configuration. This modifies the trajectory and/or the speed of the segment. The press may therefore be adapted to different models of tire.

Clearly, numerous modifications may be made to the disclosure without departing from the scope thereof.

A single tie rod for each segment has been used here. Provision could be made to divide the tie rod so that each segment was hinged with two tie rods, each being mounted slidably and rotatably in a respective one of the two openings of the segment.

The ramps 31 and 33 of the embodiment described here have been described as separate ramps. Provision may be made for them to be two portions of a single ramp. More generally, the shape and arrangement of the ramps may be modified. Although the initial sliding movement of the segment during the opening of the mold is advantageous, provision may be made for this movement to be a slight swinging.

The invention claimed is:

1. A curing press for a tire blank, the press comprising:
a frame,
a plurality of circumferentially distributed segments capable of forming a tread of the tire, each of these segments having at least one opening, and
for each segment, at least one tie rod mounted slidably and rotatably in the opening of the segment, and the at least one tie rod being hinged to the frame, this mounting and hinging forming the only connections of the tie rod to elements of the press other than the tie rod.

2. The press according to claim 1, wherein each tie rod remains housed at one end of the opening of the corresponding segment during more than half of a sliding movement of the segment.

3. The press according to claim 1, wherein each tie rod slides in the opening of the corresponding segment during a sliding movement of the segment.

4. The press according to any of the preceding claims, wherein each segment has two openings facing one another, wherein the corresponding tie rod is mounted in these two openings.

5. The press according to claim 1, further including at least one plate carrying a shell capable of forming a tire blank, and wherein the frame comprises ramps arranged to make the segments slide relative to the plate as a result of an upward sliding movement of the plate relative to the frame.

6. The press according to the claim 5, wherein each ramp of the frame is inclined upwards.

7. The press according to claim 5, wherein each ramp of the frame is curved.

8. The press according to claim 5, wherein each ramp of the frame is concave.

9. The press according to claim 5, wherein the ramps of the frame are upper ramps and wherein the frame further comprises lower ramps against which the segments can bear.

10. The press according to claim 9, wherein each lower ramp is rectilinear and inclined over more than half of its length.

11. The press according to claim 5, wherein each segment is trapped in an opening of the frame delimited, at least partially, by one or more of the ramps.

* * * * *